(12) United States Patent
Zhu et al.

(10) Patent No.: US 7,676,217 B2
(45) Date of Patent: Mar. 9, 2010

(54) METHOD FOR MALICIOUS TRAFFIC RECOGNITION IN IP NETWORKS WITH SUBSCRIBER IDENTIFICATION AND NOTIFICATION

(75) Inventors: Shouyu Zhu, Holmdel, NJ (US); Yann Boquillod, Beijing (CN)

(73) Assignee: Theta Networks, Inc., Holmdel, NJ (US)

( * ) Notice: Subject to any disclaimer, the term of this patent is extended or adjusted under 35 U.S.C. 154(b) by 465 days.

(21) Appl. No.: 11/285,790

(22) Filed: Nov. 21, 2005

(65) Prior Publication Data

US 2006/0174028 A1   Aug. 3, 2006

Related U.S. Application Data

(60) Provisional application No. 60/593,622, filed on Jan. 31, 2005.

(51) Int. Cl.
*H04M 1/66* (2006.01)
*H04M 1/68* (2006.01)
*H04M 3/16* (2006.01)

(52) U.S. Cl. .................. 455/411; 455/410; 455/412.2; 726/22; 726/23; 726/24; 709/224

(58) Field of Classification Search ............... 455/410, 455/411, 412.2; 726/22–24; 709/224
See application file for complete search history.

(56) References Cited

U.S. PATENT DOCUMENTS

| | | | |
|---|---|---|---|
| 7,295,848 B1 | 11/2007 | Elaranta | |
| 2003/0084321 A1* | 5/2003 | Tarquini et al. | 713/200 |
| 2003/0115483 A1 | 6/2003 | Liang | |
| 2003/0126234 A1 | 7/2003 | Shachar et al. | |
| 2003/0148754 A1* | 8/2003 | Ranta | 455/411 |
| 2004/0117640 A1 | 6/2004 | Chu et al. | |
| 2004/0127195 A1* | 7/2004 | An | 455/410 |
| 2004/0148520 A1* | 7/2004 | Talpade et al. | 713/201 |
| 2004/0205419 A1 | 10/2004 | Liang et al. | |
| 2005/0021740 A1* | 1/2005 | Bar et al. | 709/224 |
| 2005/0044212 A1 | 2/2005 | Lingafelt et al. | |

(Continued)

OTHER PUBLICATIONS

P-Cube Service Engine 2000 Fact Sheets.
P-Cube Press Release, "P-Cube Enables ISPs to Detect and Quarantine Spam Zombies,"[retrieved Sep. 6, 2005] retrieved from Internet http://www.p-cube.com/doc_root/news/Press_Rel/2004/20_Sept/Spam%20Final.htm.

(Continued)

*Primary Examiner*—Rafael Pérez-Gutiérrez
*Assistant Examiner*—Liton Miah
(74) *Attorney, Agent, or Firm*—Hamilton, Brook, Smith & Reynolds, P.C.

(57) ABSTRACT

A technique for recognizing malicious traffic in IP networks coupled with an identification and notification of a mobile subscriber generating or receiving malicious traffic is provided. An embodiment of the present invention may include intrusively or non-intrusively monitoring in real-time the mobile subscriber's data traffic for malicious traffic as well as mobile security intrusion attempts. Another embodiment of the present invention may report the identification of those mobile subscribers generating or receive malicious traffic to an operator. By knowing the identity of the mobile subscriber, an embodiment of the present invention may block the mobile subscriber's subscription or alert the mobile subscriber in question about the malicious traffic. One embodiment of the present invention may be applied to mobile networks where the mobile subscriber's identity is known by an unique identifier (e.g., an IMSI or a phone number) and where a notification system may be implemented using a messaging service e.g., SMS, MMS, IM, email, or voice.

33 Claims, 10 Drawing Sheets

U.S. PATENT DOCUMENTS

2005/0055578 A1 3/2005 Wright et al.
2005/0108573 A1 5/2005 Bennett et al.
2005/0125685 A1 6/2005 Samuelsson et al.
2006/0174001 A1 8/2006 Zhu

OTHER PUBLICATIONS

P-Cube, "Service Control White Paper, Pre-paid/Post-paid Billing for Mobile Data Services," pp. 1-11.
Office Action for U.S. Appl. No. 11/284,767, dated Apr. 2, 2009.

* cited by examiner

METHOD FOR MALICIOUS TRAFFIC RECOGNITION IN IP NETWORKS WITH SUBSCRIBER IDENTIFICATION AND NOTIFICATION

RELATED APPLICATION(S)

This application claims the benefit of U.S. Provisional Application No. 60/593,622, filed on Jan. 31, 2005. The entire teachings of the above application(s) are incorporated herein by reference.

BACKGROUND OF THE INVENTION

Many devices have been proposed for detecting intrusion or malicious traffic in networks. However, these devices are limited in their functionality: they do not support mobile network environments such as GSM, WCDMA, and CDMA; they cannot automatically recognize the identity of the mobile subscribers generating or receiving malicious traffic; and they do not offer any notification mechanism to the mobile subscribers.

Malicious traffic can be originated from different sources such as viruses, worms, Trojan horses, spyware, adware, other malicious programs, and hackers/crackers.

A virus is a computer program that attaches itself to a program or email so that it can spread from computer to computer. A virus must execute and replicate itself. Some examples of email viruses are MyDoom, LoveLetter, etc.

A worm is a computer program that replicates itself from computer to computer without a transport file or email. A worm usually spreads by using a network or system vulnerability without the knowledge of the user.

A Trojan horse is a program that claims to be legitimate but actually compromises the security of the system by leaving a backdoor open. The backdoor can then be used by hackers to intrude and control the system.

The line between a virus and a worm is sometimes blurred, but viruses and worms both have common goals: to spread from system to system and reach a maximum number of targets, to overload systems and networks, and to eventually create damage to systems. The goal of the Trojan horse is to compromise the system for remote control and malicious activities.

Spyware is a broad category of malicious software. Those who write and deliberately spread spyware intend to intercept or take partial control of a computer's operation without the informed consent of that machine's owner or legitimate user. Spyware differs from viruses and worms in that it does not self-replicate. Like many recent viruses, spyware is designed to exploit infected computers for commercial gain.

The term adware refers to any software which displays advertisements, whether or not it does so with the user's consent. Adware programs differ from spyware in that they do not invisibly collect and upload activity records or personal information when the user of the computer does not expect or approve of the transfer.

The hacker or cracker generates malicious code to intrude systems.

Mobile data networks such as GPRS, CDMA 1x, UMTS, etc., transport malicious traffic which are sent by mobile subscribers. The problem with viruses and worms is they cannot be stopped from spreading unless the host computer is cleaned. In the current situation, there is no existing system able to identify the infected user in the mobile network. Consequently, an infection can remain undiscovered until the user realizes he/she is infected by a virus and cleans the computer of the infection.

Additionally, there is a big difference between fixed and mobile/wireless IP networks: mobile/wireless IP networks have a bandwidth limitation and the cost of an air interface and routing equipment (e.g., BSC, SGSN, GGSN, PDSN, etc.) is much more expensive than fixed internet IP routers.

GPRS/WCDMA/CDMA1x laptops are infected by mobile subscribers which send malicious programs that cripple IP networks with dangerous and high load traffic. Additionally, some systems are infected by Trojan horses that can allow the system to be remotely controlled and generate even more malicious traffic on the network. The problem with viruses and worms is they cannot be stopped from spreading unless the host computer is cleaned. In the current situation, there is no existing system able to identify the infected user, and consequently an infection can remain undiscovered until the user realizes he/she is infected by a virus and cleans the computer of the infection.

In the future, mobile phone viruses will pose the same threats to the network as those created by viruses on GPRS laptops.

SUMMARY OF THE INVENTION

In view of the limitations present in the prior art, an embodiment of the present invention provides a new and useful process for malicious traffic recognition in IP networks with mobile subscriber identification and notification.

An embodiment of the present invention provides a process for recognizing malicious traffic in a mobile network which includes: (i) identifying a mobile subscriber by a mobile subscriber identity, (ii) detecting a malicious traffic associated with the mobile subscriber, and (iii) notifying the mobile subscriber of the malicious traffic associated with the mobile subscriber using the mobile subscriber identity.

One embodiment of the present invention provides a malicious traffic detection method and system for IP networks. The malicious traffic detection method and system analyzes the network for malicious traffic originating from the mobile subscribers or going towards the mobile subscribers. In the case of mobile IP networks such as GPRS, EDGE, WCDMA, CDMA or UMA, the method and system may identify mobile subscribers by their unique and permanent identifiers. Contrastingly, existing Intrusion Detection Systems (IDS) only report the IP address of the mobile subscriber. An embodiment of the present invention, however, may report the mobile subscriber's unique mobile network identifier such as MSISDN (E.164), IMSI (E.214) or other mobile phone number format.

For example, one embodiment of the present invention may find and report the phone numbers of mobile subscribers who are sending infectious traffic generated by worms on their mobile phones or mobile computer systems. Another embodiment of the present invention may notify the mobile subscribers by a messaging service (e.g., a SMS message, MMS message, IM message, a phone call, a Push-to-Talk message, an e-mail, or a voice mail) or by URL re-direction, e.g., HTTP redirection and WAP redirection. In yet another embodiment of the present invention, the status of a mobile subscriber's infection may be tracked. In still another embodiment of the present invention, the mobile subscriber's mobile account may be disabled permanently or temporarily to prevent the spread of infection to other mobile subscribers.

The foregoing has outlined, in general, the aspects of the invention and is to serve as an aid to better understanding the more complete detailed description which is to follow. In reference to such, there is to be a clear understanding that the present invention is not limited to the method or detail of construction, fabrication, material, or application of use described and illustrated herein. Any other variation of fabrication, use, or application should be considered apparent as an alternative embodiment of the present invention.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

A description of preferred embodiments of the invention follows.

An embodiment of the present invention may be a software system which analyzes the IP network traffic for malicious traffic patterns, reports the identification of the mobile subscriber, notifies the mobile subscriber and tracks malicious activity of the mobile subscriber after notification. Another embodiment of the present invention may also comprise its own hardware which will run the software, usually, but limited to a computer server or an IP router.

An embodiment of the present invention may apply to the fields of fixed IP networks and mobile IP networks such as, but not limited to, GSM, GPRS, EDGE, WCDMA, CDMA 1×RTT, CDMA 1×EV/DO, CDMA 1×EV/DV, iDEN.

Figure 1:
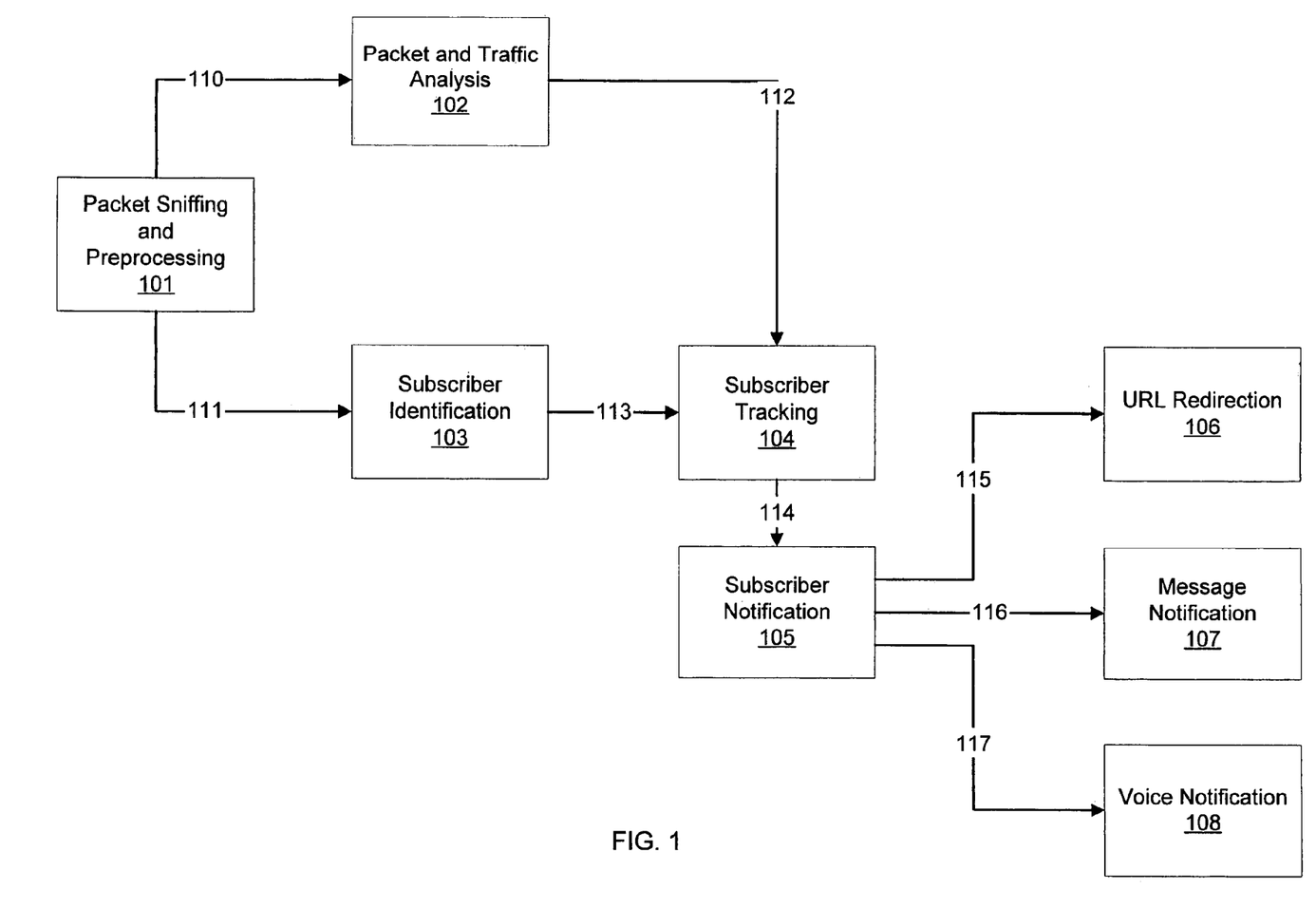
FIG. 1 is a flow diagram illustrating an exemplary process flow in one implementation of the preferred embodiment of the invention showing the interrelationships of the modules.

Referring to FIG. 1, an embodiment of the present invention may be composed of 5 modules or a combination of those modules. Those 5 modules are the "Packet Sniffing and Pre-processing module" 101, the "Packet and Traffic Session Analysis module" 102, the "Subscriber Identification module" 103, the "Subscriber Notification module" 105 and the "Subscriber Tracking module" 104.

Figure 2:
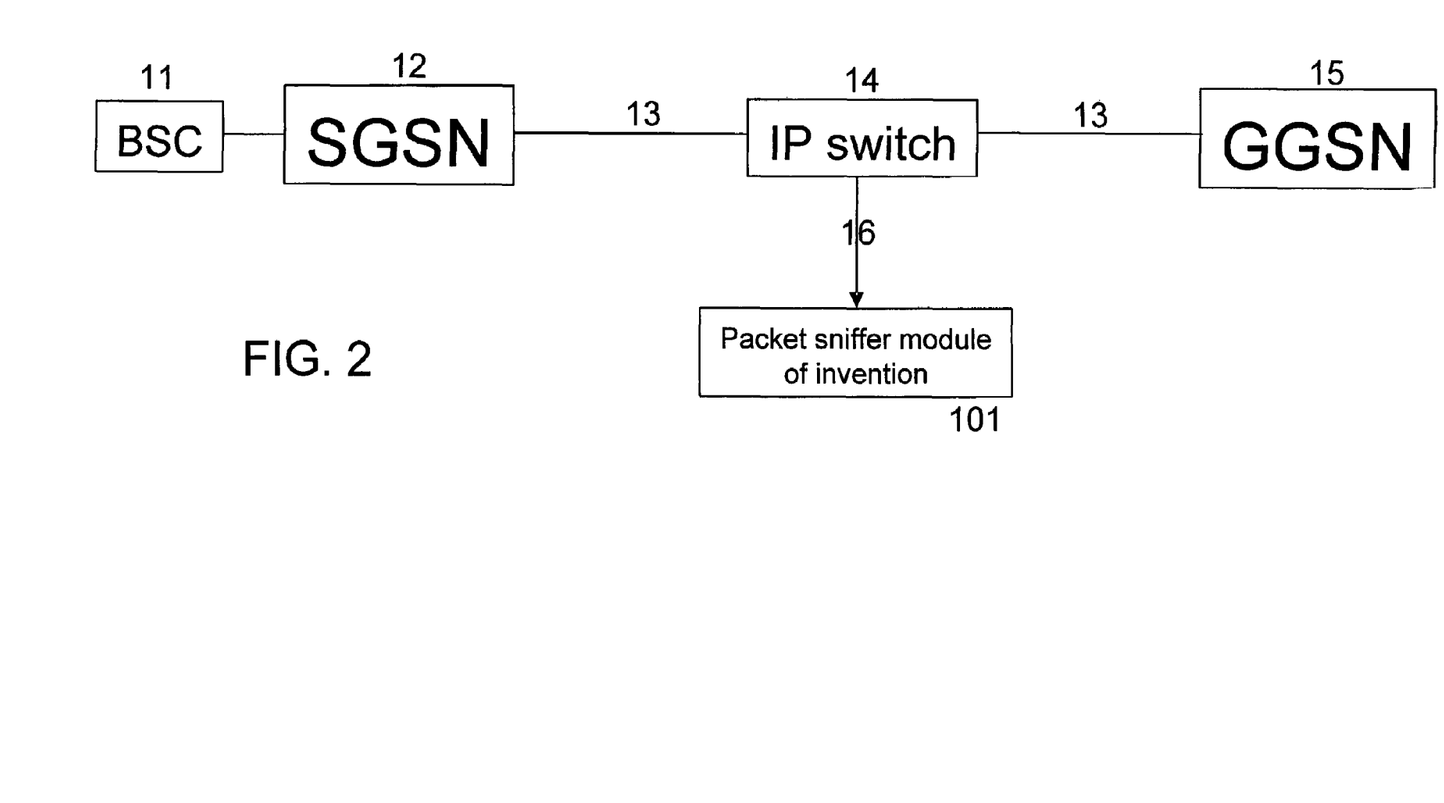
FIG. 2 is a block diagram of an exemplary connection method of the system to capture mobile data traffic, recognize malicious traffic and identify the mobile subscriber in a GSM/EDGE/WCDMA network according to a preferred embodiment of the invention.
Figure 3:
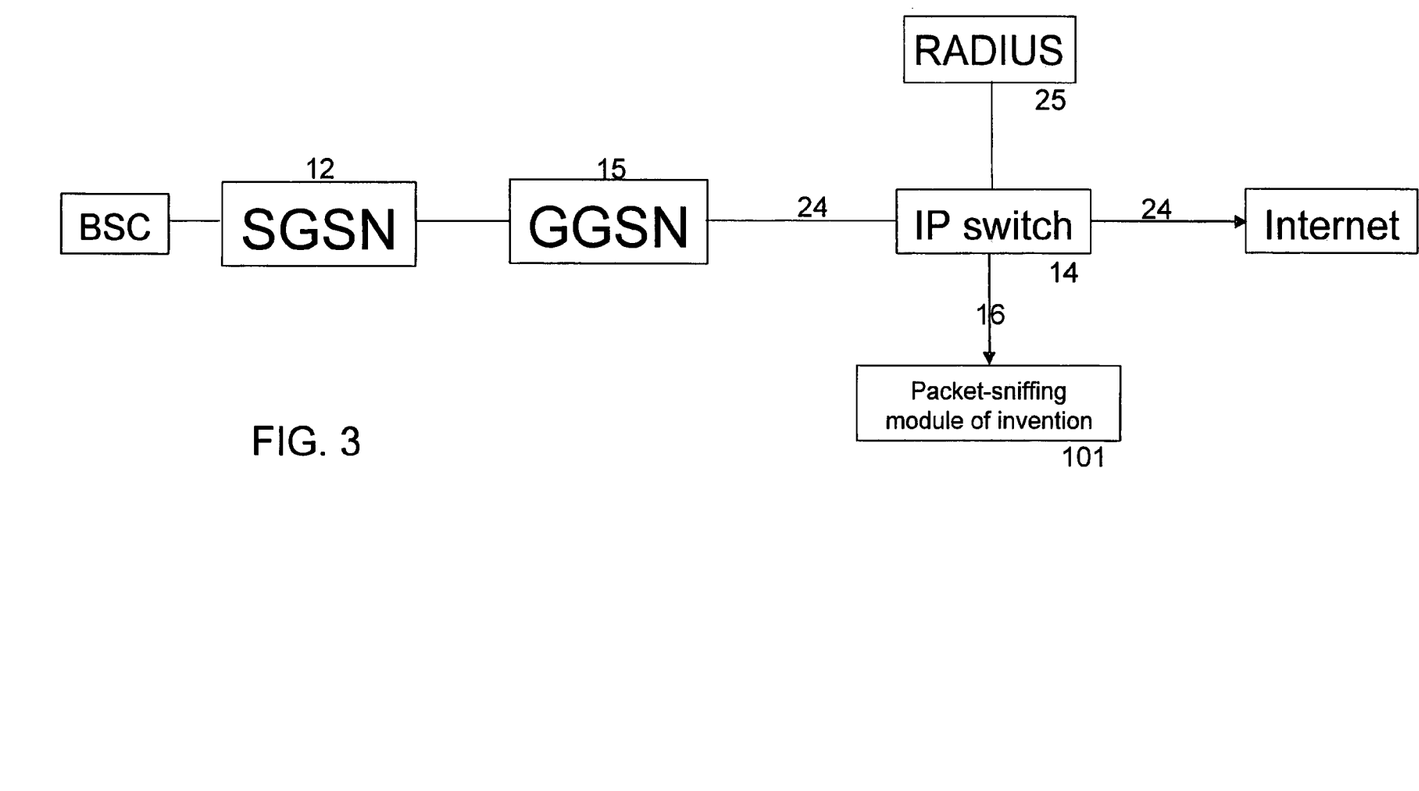
FIG. 3 is a block diagram of another exemplary connection method of the system to capture mobile data traffic, recognize malicious traffic and identify the mobile subscriber in a GSM/EDGE/WCDMA network according to a preferred embodiment of the invention.
Figure 4:
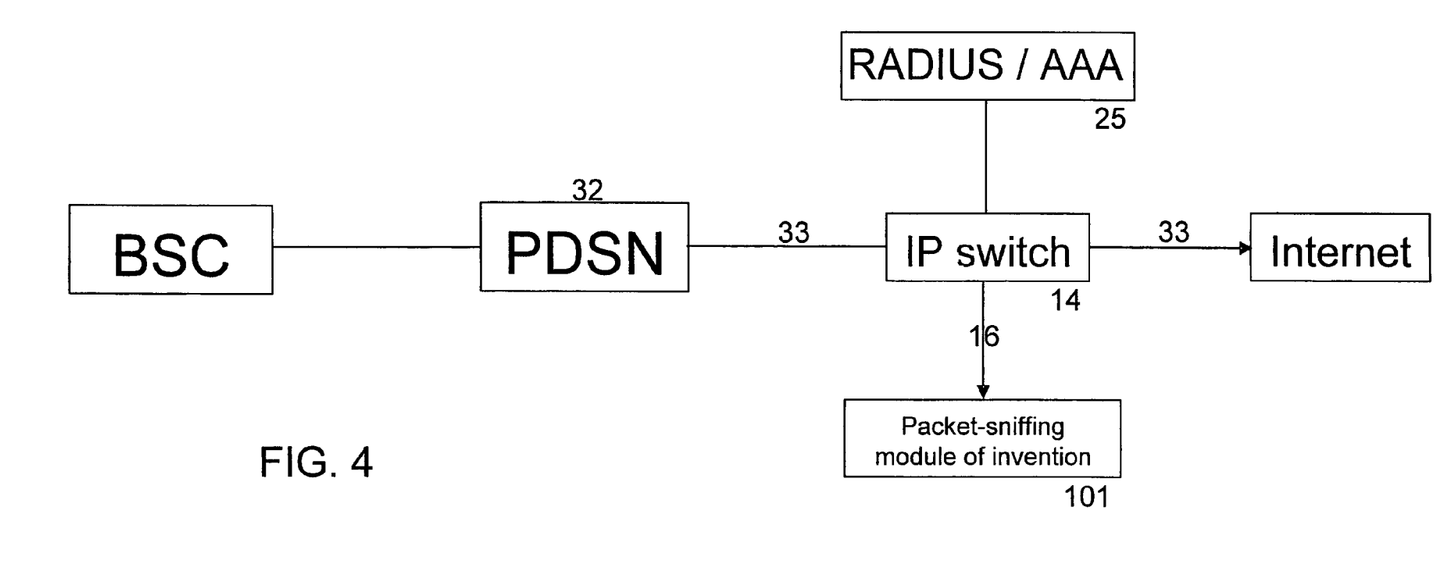
FIG. 4 is a block diagram of an exemplary connection method of the system to capture, recognize malicious traffic and identify the mobile subscriber in a CDMA network according to a preferred embodiment of the invention.

One embodiment of the present invention generally comprises a "Packet Sniffing and Pre-processing module" 101 which captures the data traffic at the core part of the network. The data capture may be performed in a non-intrusive way for additional safety, but intrusive data capture may also possible. FIGS. 2, 3 & 4 illustrate an exemplary non-intrusive method of capturing data in a GPRS/EDGE/WCDMA and CDMA networks, respectively.

Referring to FIG. 2 and FIG. 3, in a GPRS/EDGE/WCDMA network the "Packet Sniffing module" 101 may be located between the SGSN 12 and GGSN 15 on the Gn interface 13. In cases where the GGSN 15 uses the accounting feature of the RADIUS server 25 for each PDP context activation, the "Packet Sniffing module" 101 may be located between GGSN 15 and the edge of the network 26.

Referring to FIG. 4, in a CDMA network, the "Packet Sniffing module" 101 may be located between the PDSN 32 and the edge of the network on the Pi interface 33. The captured traffic may include the mobile subscribers' traffic and traffic from the RADIUS/AAA server 25.

In mobile IP networks the data may be captured by the network element itself (for example, but not limited to, SGSN 12, GGSN 15, PDSN 32, IP switch/router 14) or between two network elements through the IP switch/router 14. For example, the data may be sent to the "Packet Sniffing" module 101 through a mirror port (or SPAN port 16) on the IP switch/router 14.

SPAN 16 stands for Switched Port Analyzer and is a feature used for selecting the network traffic and mirroring it to a specified port. By connecting to a SPAN port 16, an embodiment of the present invention does not impact normal network traffic. It does not slow down the normal operations of the network. It simply receives a duplicated set of data from the SPAN port 16.

Figure 5:
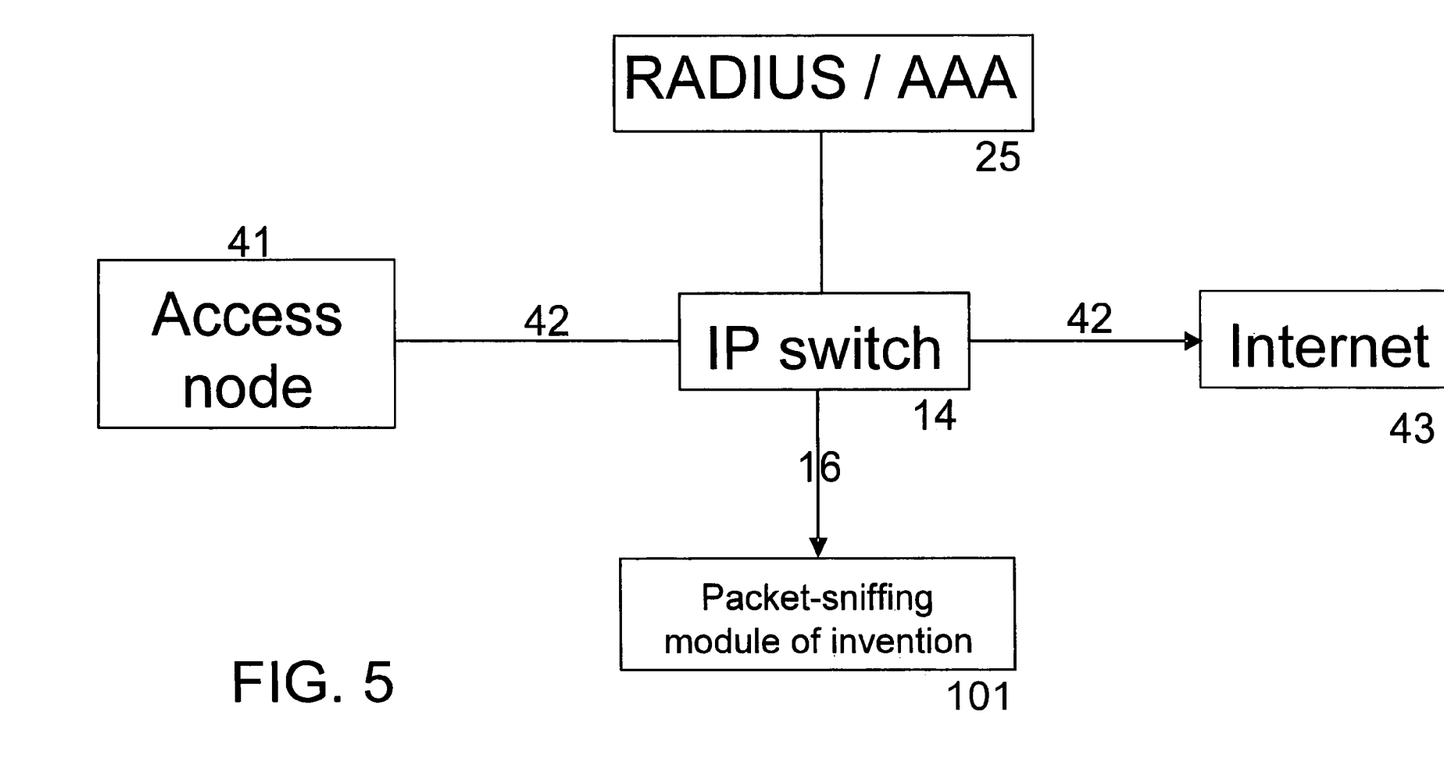
FIG. 5 is a block diagram of an exemplary connection method of the system to capture, recognize malicious traffic and identify the mobile subscriber in a fixed internet network according to a preferred embodiment of the invention.

Referring to FIG. 5, in a fixed IP network, data may be captured so that the mobile subscriber's IP traffic and traffic from the RADIUS/AAA server 25 are both sent to the "Packet Sniffing module" 101. In a fixed IP networks, data capture may be performed through a mirror port (or SPAN port 16) at an IP switch/router 14. The IP switch/router 14 may be placed at the interface 42 between the access node 41 and the Internet 43. If traffic from the RADIUS/AAA server 25 is not available, the traffic may still be mirrored to the "Packet Sniffing module" 101, but the mobile subscriber may not be identified.

Referring back to FIG. 1, the "Packet Sniffing module" 101 performs basic packet pre-analysis. The "Packet Sniffing module" 106 may redirect the IP traffic 111 which is used to identify the mobile subscriber to the "Identification module" 103. For example, in GPRS/EDGE/WCDMA networks, the "Packet Sniffing module" 101 may redirect all the GTP-C (General Tunneling Protocol Control) packets such as "PDP context create" packets (not shown) to the "Identification module" 103. From these packets it is possible to extract the identity of the mobile subscriber. For fixed IP and CDMA networks, the "Packet Sniffing module" 101 may redirect RADIUS related packets towards the "Identification module" 103. All other types of traffic may be sent to the "Packet and Traffic Session Analysis module" 102.

Continuing with FIG. 1, another module is the "Packet and Session Analysis module" 102 which processes packets received and reassembles them per mobile subscriber session. The IP traffic of the mobile subscriber may be reassembled into sessions and analyzed at a service layer, such as SMTP, HTTP, etc.

The sessions may then be processed against a set of predefined rules in order to detect any malicious traffic patterns such as viruses, worms, Trojan horses, spyware, adware, or intrusion attempts by hacker/crackers. It should be readily apparent to those of ordinary skill in the art, the claimed invention is no way limited to the aforementioned examples of malicious traffic patterns. Moreover, one of ordinary skill in the art will appreciate that the principles disclosed in this disclosure are readily applicable to other forms of malicious traffic pattern known in the art.

An output 112 of the "Packet and Session Analyzer module" 102 may be a data record of a malicious IP session, such as an IP address, a type of malicious traffic (e.g., virus, intrusion attempt, worm, spyware, adware, etc.), and a known-name of the malicious type. The output 112 may then be sent to the "Subscriber Tracking module" 104.

The "Subscriber Identification module" 103 matches a mobile subscriber identity 113 with an IP session 112 recognized to have malicious traffic. The mobile subscriber's permanent identity may be, but is not limited to, a phone number or login name of the mobile subscriber. In IP networks, mobile subscribers may be identified by their IP address which may make it hard to find the actual mobile subscriber associated with it. In the case where IP addresses are dynamically allocated, the mobile subscriber will only own the IP address for the length of its connection. Once the mobile subscriber releases its connection, the mobile subscriber's IP address is also released. Another mobile subscriber may then use the same IP address. Therefore the IP address cannot be used as a permanent identity to recognize the mobile subscriber.

The "Subscriber Identification module" 103 may keep track of all opened sessions in the network. Those opened sessions may be characterized by an IP address with the mobile subscriber identity. When the mobile subscriber logs in the network, the "Subscriber Identification module" 103 may match the mobile subscriber's IP address with the mobile subscriber's permanent identifier.

In the case of a GPRS/EDGE/WCDMA network, the identity of the mobile subscriber may be obtained from relevant data capture at the Gn interface 13 between the SGSN 12 and the GGSN 15. The relevant data may be in GTP-C messages sent during a PDP context activation process. The "Subscriber Identification module" 103 may capture a "PDP context create request" message coming from the SGSN 12 which includes a MSISDN (in E.164 format) or an IMSI (in E.214 format) of the mobile subscriber and a "PDP create response" message replied by the GGSN 15 which includes an assigned IP address. The "Subscriber Identification module" 103 may track, in real-time, all online IP sessions available per mobile identity. The "Subscriber Identification module" 103 may close each online IP session when a PDP context deactivation message is sent.

For CDMA networks and for certain GPRS/EDGE/WCDMA networks, the "Subscriber Identification module" 103 may collect the mobile subscriber's phone number during a RADIUS accounting process when the PDSN 32 (or GGSN 15) requests the RADIUS server 25 to perform accounting for the mobile subscriber. See FIG. 3 and FIG. 4. In the RADIUS accounting packets exchanged between the PDSN 32 (or GGSN 15) and the RADIUS server 25, a starting and ending time of a session, an IP address, and a phone number of the mobile subscriber may be collected.

For fixed IP networks such as ADSL or other broadband technologies, the mobile subscriber identity may be similarly collected during the RADIUS accounting or authentication process.

The methods previously described for collecting the mobile subscriber identity in, for example, a GPRS, EDGE, WCDMA, CDMA, UMA or fixed IP networks are all non-intrusive and may be performed, for example, passively through the mirror or SPAN port 16 on the IP switch/router 14. The mobile subscriber identity may also be collected intrusively. For example, an embodiment of the present invention may be "inline" between two network elements or may be itself part of a network element, such as the IP switch/router 14.

In contrast, the "Subscriber Identification Module" 103 may actively identify the mobile subscriber by querying network elements which may store the mobile subscriber' identity against the IP address and the time of the session. Those network elements may include a Charging Gateway (not shown), the GGSN 15, the SGSN 12, the RADIUS/AAA server 25, a HLR (not shown), or any relevant network element which stores a match between the session's IP address and the mobile subscriber's identity.

Referring to FIG. 1, the "Subscriber tracking module" 104 may monitor mobile subscribers that are sending or receiving malicious traffic. The "Subscriber tracking module" 104 may receive the malicious traffic session information 112 from the "Packet and Session Analyzer module" 102. The "Subscriber tracking module" may then request the mobile subscriber identity 113 related to the IP session from the "Subscriber Identification module" 103.

After matching the malicious IP session information 112 and the subscriber identity 113, the "Subscriber tracking module" 104 may continue to receive malicious IP session information 112 from the "Packet and Session Analyzer module" 102. The "Subscriber Tracking module" 104 may send in real-time the mobile subscriber malicious activity status (not shown) to a graphical user interface for display (not shown). The "Subscriber Tracking module" may also process the malicious IP session information 112 against user-defined rules and thresholds. For example, if the mobile subscriber reaches 100 Kbytes of virus traffic sent, the "Subscriber tracking module" 104 may send an alert 114 to the "Subscriber notification module" 105 which may do further processing. Similarly to the previous example, if the mobile subscriber attempts more than 5 times to intrude a server, the "Subscriber tracking module" 104 may send the alert 114 to the "Subscriber notification module" 105. The rules and threshold may be defined by a user of the system.

The "Subscriber tracking module" 104 may check its memory or database if the mobile subscriber has a history of previous malicious activities. If the mobile subscriber identity is recognized by the "Subscriber tracking module" 104 as a previously malicious mobile subscriber, the "Subscriber Tracking module" 104 may go through its internal rules or user-defined rules (i.e., rules defined by the user of the system) to determine whether to send a new notification or not.

The "Subscriber notification module" 105 may receive malicious IP session information 112 with the mobile subscriber identity 113.

The "Subscriber Notification module" 105 may pass details of the mobile subscriber's identity 113 to one of several sub-modules for further processing, as dictated by the user of the system. The sub-modules may be, for example, a "URL Redirection sub-module" 106, a "Messaging Notification sub-module" 107, and a "Voice Notification sub-module" 108.

Figure 6:
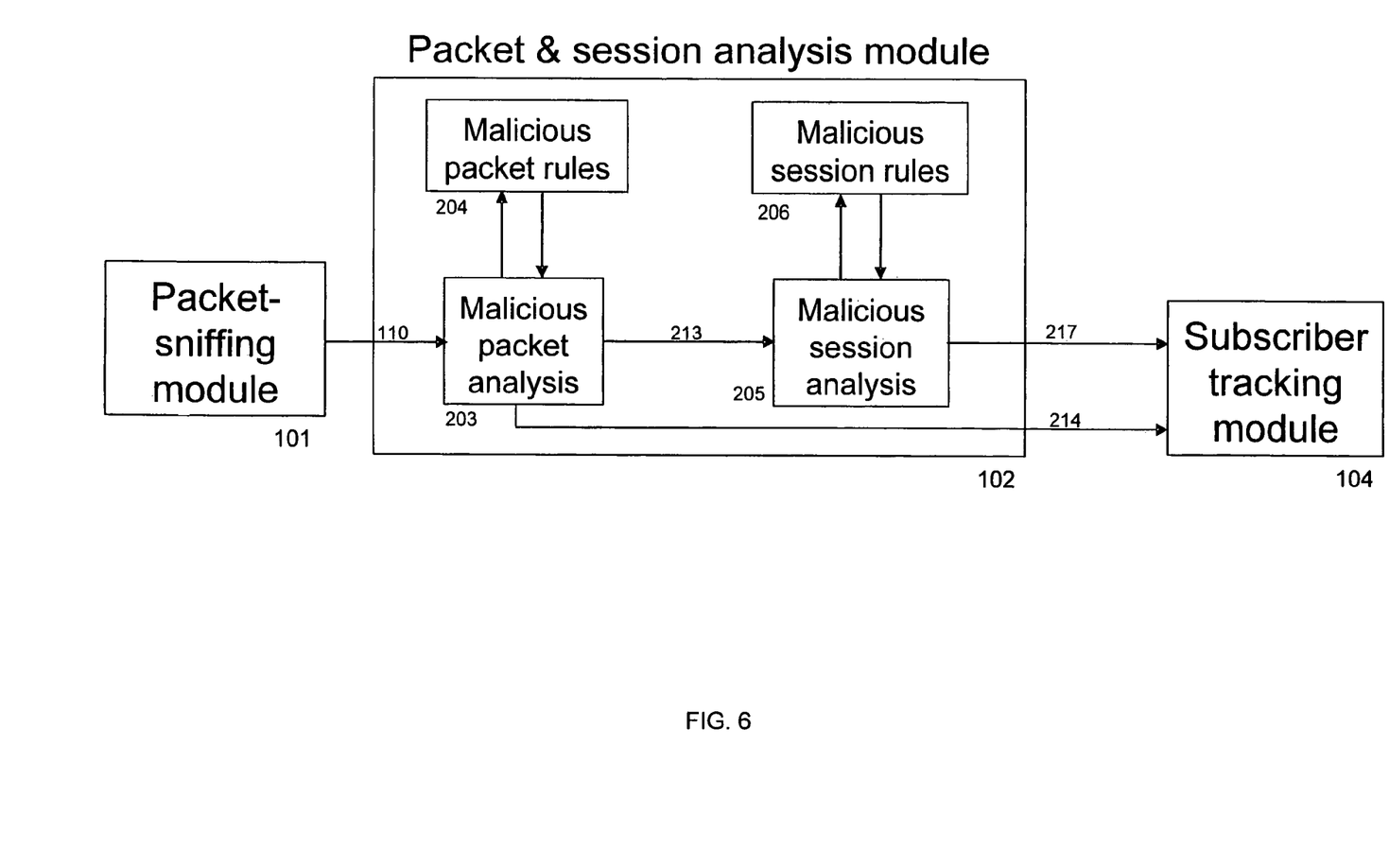
FIG. 6 is a flow diagram illustrating exemplary operational steps of how the malicious packets are processed within the "Packet and Session Traffic Analysis module"

FIG. 6 details an exemplary implementation of the "Packet and Session Traffic Analysis module" 102. The "Packet and Session Analysis module" 102 may be composed of two sub-modules, for example, a "Malicious Packet Analysis sub-module" 203 and a "Malicious Session Analysis sub-module" 205.

The "Packet Analysis sub-module" 203 may process packets one by one independently of each other, while the "Session Analysis sub-module" 205 may process IP sessions, e.g., TCP, UDP and ICMP sessions.

An IP session is a related group of IP packets sent or received by a mobile subscriber. For example an HTTP session may be composed of the hand-shake TCP connect, followed by the HTTP traffic and closed by TCP disconnect.

An email virus session sent to a recipient may be composed of IP packets using the SMTP protocol.

The "Packet Sniffing module" 101 may send an IP packet 110 to the "Packet and Session Analysis module" 102. The IP packet 110 may be first independently analyzed by the "Malicious Packet Analysis sub-module" 203 which may check the contents of the IP packet 110 against a set of malicious packet rules 204.

Types of malicious traffic may be, for example, an HTTP GET request that contains malformed content used to create a buffer overflow intrusion attempt on a web server.

If the IP packet 110 is found to contain malicious content, the "Malicious Packet Analysis sub-module" 203 may report the IP packet 110 and IP packet related information 214 (e.g., an IP address, a type of malicious packet, a name of the malicious content, a size of the IP packet, etc.) to the "Subscriber Tracking module" 104.

If the IP packet 110 is not flagged as a malicious packet (i.e., the IP packet 110 did not contain malicious content), then the "Malicious Packet Analysis sub-module" 203 may pass a non-flagged IP packet 213 to the "Malicious Session Analysis sub-module" 205.

The "Malicious Session analysis sub-module" may collect the non-flagged IP packet 213 and re-assemble the non-flagged IP packet 213 with other IP packets related to the same traffic session. Once the traffic session is re-assembled, the "Malicious Session Analysis sub-module" 205 may check a malicious session rules 206 to determine whether the traffic session is considered malicious or not. If the traffic session is considered malicious (according to the malicious session rules 206), the "Malicious Session Analysis sub-module" 205 may collect a description of the session.

If the "Malicious Session Analysis sub-module" 205 determines the session 217 is malicious, "Malicious Session Analysis sub-module" 205 may then forward the session 217 and information relating to the session 217 to the "Subscriber Tracking module" 104. If, however, the "Malicious Session Analysis sub-module" 205 determines that the session 217 is not malicious, "Malicious Session Analysis sub-module" 205 may discard the session 217 and the information relating to the session 217.

Figure 8:
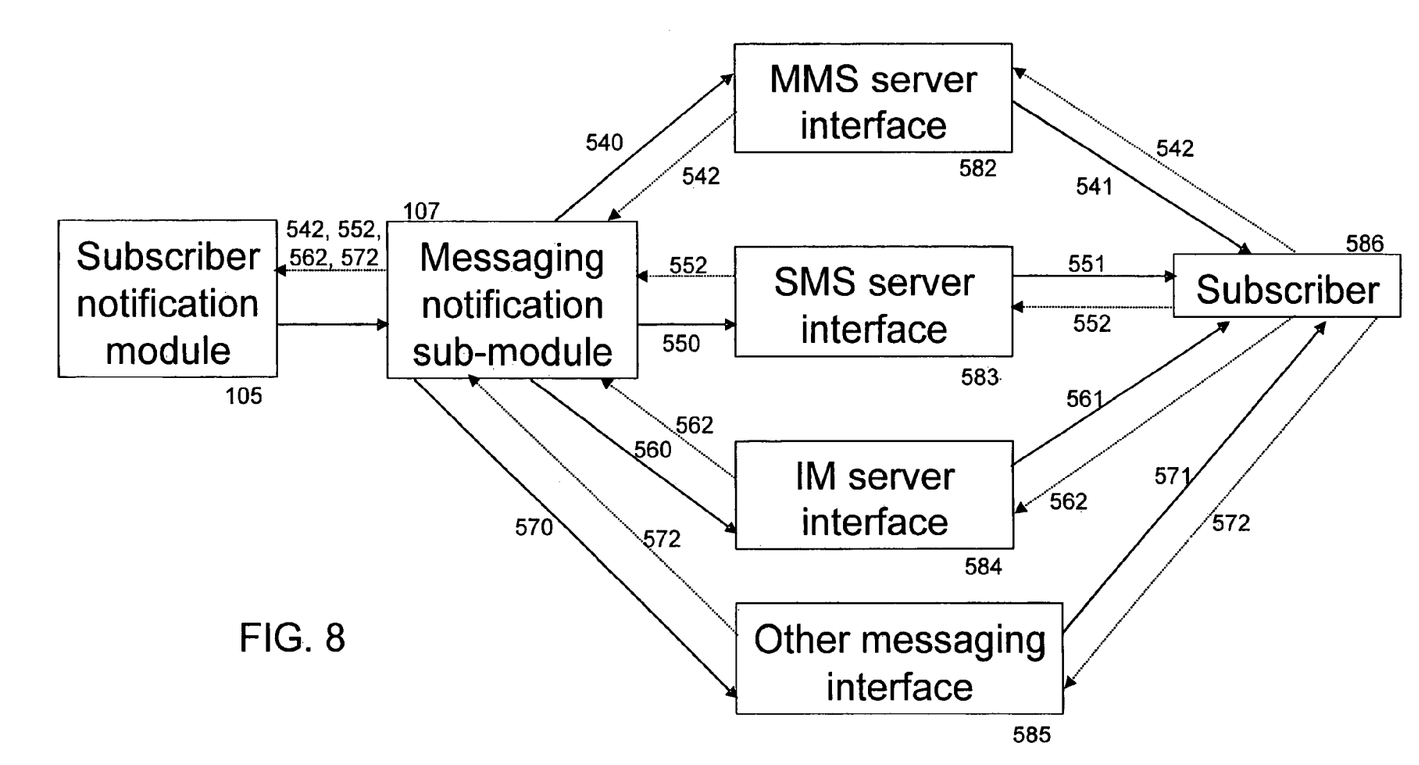
FIG. 8 is a flow diagram illustrating exemplary operational steps of how the mobile subscriber is notified of his/her malicious actions via MMS, SMS, IM, or other messaging and how the delivery report is returned to the "Subscriber Notification module"

FIG. 8 illustrates an exemplary implementation of the "Subscriber notification module" 105. As may be dictated by a user of the system, the "Subscriber Notification module" 105 may format and forward information to the mobile subscriber 586 by a SMS (Short Message Service) messages 551, a MMS (Multimedia Message Service) message 541, an IM (Instant Messaging) message 561, or a message of other messaging services 571 (e.g., Push-to-Talk, email and voice mail).

In cases where the mobile subscriber 586 is to be notified by SMS (e.g., as per the policy of the user of the system), a notification 550 may be sent to a SMS server interface 583 from the "Messaging Notification sub-module" 107. Subsequently, the mobile subscriber 586 may be notified via a SMS message 551. A delivery report 552 may be returned to the SMS server interface 583 which may then forward the delivery report 552 to the "Messaging Notification sub-module" 107.

In cases where the mobile subscriber 586 is to be notified by MMS (e.g., as per the policy of the user of the system), a notification 540 may be sent to a MMS server interface 582 from the "Messaging Notification sub-module" 107. Subsequently, the mobile subscriber 586 may be notified via a MMS message 541. A delivery report 542 may be returned to the MMS server 582 which may then forward the delivery report 542 to the "Messaging Notification sub-module" 107.

In cases where the mobile subscriber 586 is to be notified by IM (e.g., as per the policy of the user of the system), a notification 560 may be sent to an IM server interface 584 from the "Messaging Notification sub-module" 107. Subsequently, the mobile subscriber 586 may be notified via an IM message 561. A delivery report 562 may be returned to the IM server 584 which may then forward the delivery report 542 to the "Messaging Notification sub-module" 107.

In cases where the mobile subscriber 586 is to be notified by other messaging service (e.g., Push-to-Talk, email and voice mail as per the policy of the user of the system), a notification 570 is sent to an other messaging server 585 from the "Messaging Notification sub-module" 107. Subsequently, the mobile subscriber 586 may be notified via a message 571 (e.g., a Push-to-Talk message, an email message or a voice mail message). A delivery report 572 may be returned to the other messaging server 585 which may then forward the delivery report 572 to the "Messaging Notification sub-module" 107.

In addition to being forwarded to the "Messaging Notification sub-module" 107, the delivery reports 572 may also be forwarded to the "Subscriber Notification module" 105. Consequently, the user of the system will then know if the mobile subscriber 586 has received notification of the malicious activities.

In the case of notification via MMS, the user of the system may also be informed when the mobile subscriber 586 has read the delivery report 542.

Figure 9:
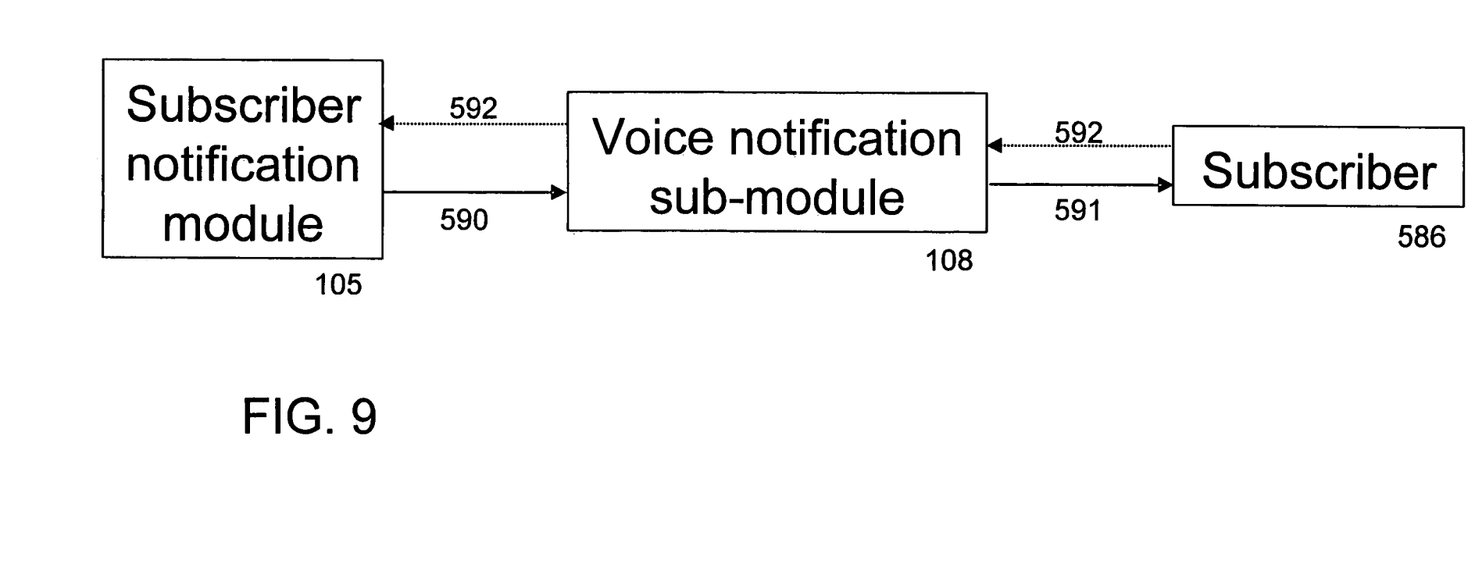
FIG. 9 is a flow diagram illustrating exemplary operational steps of how the mobile subscriber is notified of his/her malicious actions via automated voice message and how the delivery report is returned to the "Subscriber Notification module"

Referring to FIG. 9, in cases where the mobile subscriber 586 is to be notified by voice (e.g., a telephony call as per the policy of the user of the system), a mobile subscriber's details 590 may be passed to the "Voice Notification sub-module" 108, which may then call the mobile subscriber 586 with an automated voice message 591. The automated voice message 591 may ask the mobile subscriber 586 to acknowledge that he/she understands the situation with a response 592. The response 592 may then be passed to the "Subscriber Notification module" 105.

Referring back to FIG. 8, the "Notification Messaging sub-module" 107 may connect to a messaging server (e.g., a SMSC, a MMSC, or an IM server) through an interface, e.g., the MMS server interface 582. The "Notification Messaging sub-module" 107 may also connect, for example, to a GSM/

GPRS/EDGE/WCDMA/CDMA modem (not shown) which may send the notification (e.g., MMS message 542) through an air interface to the mobile subscriber 586 in question.

Figure 7:
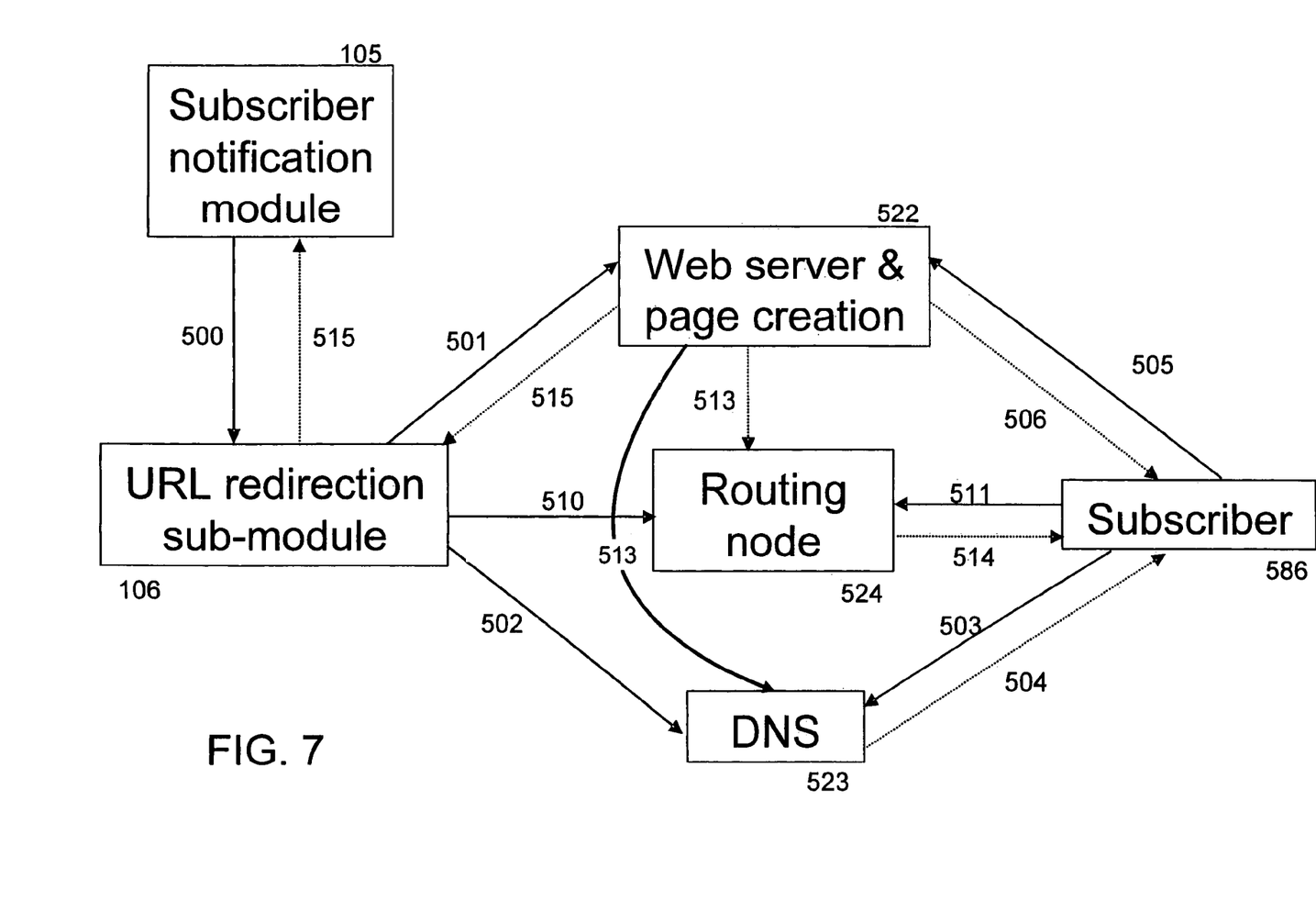
FIG. 7 is a flow diagram illustrating exemplary operational steps of how the mobile subscriber is notified of his/her malicious actions via URL re-direction through the DNS or through the firewall/IP router.

FIG. 7 describes another exemplary implementation of the "Subscriber Notification module" 105. The "Subscriber Notification module" 105 may send a redirection request 500 to the "URL Redirection sub-module" 106 to process a notification (not shown). The "URL Redirection sub-module" 106 may then send a creation request 501 to a web server 522. The creation request 501 may include information about the mobile subscriber's malicious traffic, e.g., virus type, hacking attempts, traffic sent, IP address, etc. The web server 522 may craft a specially designed web page 506 which the mobile subscriber 586 may retrieve at a later stage.

Traffic from the mobile subscriber 586 may be redirected to the web server 522. For example, the traffic from the mobile subscriber 586 may be redirected by a DNS method (described below). As another example, the traffic from the mobile may be redirected by a routing node method (described below).

The DNS Method

Referring to FIG. 7, the "URL Redirection sub-module" 106 may send an IP address 502 of the mobile subscriber 586 to a DNS 523. When the mobile subscriber 586 generates a DNS request 503 to collect the IP address of a domain name, the DNS 523 may return a DNS response 504 with the IP address of the web server 522 instead of the IP address matching the DNS request 503 queried by the mobile subscriber 586.

The "URL Redirection sub-module" 106 may be further optimized by only redirecting DNS request 503 containing the string "www." at the beginning of the domain name. In this way, the "URL Redirection sub-module" 106 will not affect DNS requests 503 from mobile subscriber 586 which do not relate to HTTP traffic.

Once the mobile subscriber 586 receives the DNS response 504 with the IP address for the web server 522, the mobile subscriber's HTTP GET request 505 is not sent to the IP address matching the mobile subscriber's DNS request 503, but rather to the web server 522.

Upon receiving the HTTP GET request 505 from the mobile subscriber 586, the web server 522 may check its memory or a database for an IP address matching the mobile subscriber's IP address. If the mobile subscriber's IP address is found, the web server 522 may return the web page 506 specially crafted for the mobile subscriber 586. The web page 506 may inform the mobile subscriber 586 of malicious activities and may include instructions on how to stop these activities.

Once the mobile subscriber 586 retrieves the web page 506, the web server 522 may return a "notification success" message 515 to the "URL Redirection sub-module" 106. The "URL Redirection sub-module" 106 may forward the "notification success" message 515 to the "Subscriber Notification module" 105.

The Routing Node Method

Referring to FIG. 7, a routing node 524 may be an element in the network which can modify a HTTP GET request and re-route traffic based on pre-defined rules. Accordingly, the routing node 524 may be, but not limited to, a firewall, an IP router or an IP edge router.

The "URL Redirection sub-module" 106 may send an IP address 510 of the mobile subscriber 586 to the routing node 524. When the mobile subscriber 586 generates a HTTP GET request 511, the HTTP GET request 511 may be re-formatted and re-routed by the routing node 524. Consequently, instead of the original HTTP GET request 511, a re-formatted and re-routed HTTP GET request 512 is sent to the web server 522 instead.

The web server 522, upon receiving the re-formatted and re-routed HTTP GET request 512, may check its memory or a database for an IP address matching the mobile subscriber's IP address. If found, the web server 522 may return the web page 506 specially crafted for the mobile subscriber. The web page 506 may inform the mobile subscriber of the malicious activities and may provide instructions how to stop those activities.

Once the mobile subscriber 586 retrieves the web page 506, the web server 522 may return the "notification success" message 515 to the "URL Redirection sub-module" 106. The "URL Redirection sub-module" 106 may forward the "notification success" message 515 to the "Subscriber Notification module" 105.

While the aforementioned "URL Redirection sub-module" 106 is described in the context of redirecting a HTTP GET request, one skilled in the art should readily appreciate that the claimed invention is not limited to HTTP, but is applicable to other application protocols. For example, the "URL Redirection sub-module" 106 may redirect a WAP GET request (not shown) from the mobile subscriber 586. Similar to redirecting the HTTP GET request 511 previously described, the DNS 523 or the routing node 524 may redirect the WAP GET request to a WAP server (not shown). The WAP server in turn may return a WAP page (not shown) specially crafted for mobile subscriber 586. The WAP page may inform the mobile subscriber 586 of malicious activities and may provide instructions how to stop those activities.

In the case of intrusion attempts by the mobile subscriber 586, the web page 506 may display a warning and/or legal information about risks taken by the mobile subscriber 586 if the malicious activity is further continued.

In the case of virus infection, the web page 506 may display the instructions on how to disinfect the infected machine. To decrease the rate of malicious traffic without affecting the mobile subscriber satisfaction, the web page 506 may be designed so that the mobile subscriber 586 may acknowledge the situation by pressing a button (not shown). The mobile subscriber 586 may then continue to use the network.

In the case of the mobile subscriber 586 acknowledging the web page 506, the web server 522 may send an unblock request 513 to the DNS 523 or the routing node 524 to unblock the mobile subscriber's network access.

The "Subscriber Notification module" 105 may also forward information regarding whether the mobile subscriber 586 acknowledged the web page 506 to an administrative system (not shown) which may further act on it. The following are exemplary actions which may take place.

For example, the "Subscriber Notification module" 105 may send an alert to external equipment which may block a mobile subscriber's account and therefore stop the malicious traffic from spreading in the network.

Figure 10:
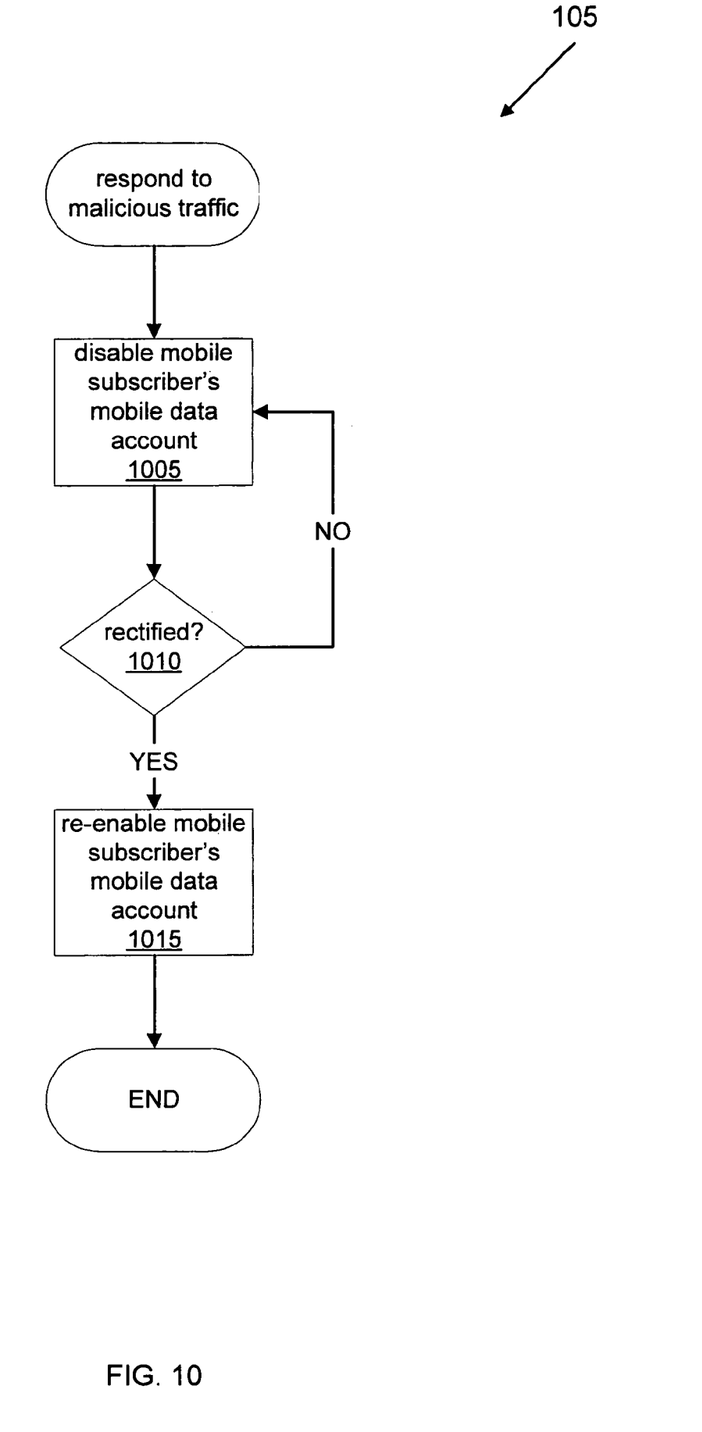
FIG. 10 is a flow diagram illustrating exemplary operational steps for causing a mobile subscriber's mobile data account to be disabled in response to malicious traffic and then re-enabled when malicious traffic is rectified.

In another example, in a mobile network, the "Subscriber Notification module" 105 may send a blocking alert (not shown) to a network element which temporarily or permanently disables the mobile subscriber's mobile data account (e.g., a HLR, not shown). Referring to FIG. 10, in response to a malicious traffic, the "Subscriber Notification module" 105 may, for example, at a step 1005 cause the network element to disable the mobile subscriber's mobile data account. If at a step 1010 the malicious traffic is rectified, the "Subscriber Notification module" 105 may cause the network element to re-enable the mobile subscriber's mobile data account at a step 1015. If, however, the malicious traffic is not rectified at the step 1010, the "Subscriber Notification module" 105 may continue to cause the network element to disable the mobile subscriber's mobile data account. Examples of rectifying the malicious traffic to cause the mobile subscriber's mobile data account to be re-enable include, but are not limited to, the mobile subscriber acknowledging that malicious traffic is being sent by the mobile subscriber, and removing the source of the malicious traffic, e.g., a virus.

In another example relating to mobile subscribers who are infected by a virus and send significant amount of malicious traffic over the wireless network, those mobile subscribers may be charged for the malicious traffic sent. The "Subscriber Notification module" 105 may be used to send session details (e.g., mobile subscriber's phone number, IP address, session timestamps, number of packets sent, number of bytes sent, an identification of malicious activity) to a database system that may be called in case of litigation.

In the case of fixed IP network access such as ADSL, the notification may be performed through an Interactive Voice Response (IVR). The IVR may call the mobile subscriber with a standard phone call to the fixed line of the mobile subscriber, and may inform the mobile subscriber of the problem.

Once the "Subscriber Notification module" 105 has notified the mobile subscriber 586, whether successfully or not, the "Subscriber Notification module" 105 may inform the "Subscriber Tracking module" 104 the result of the operation.

While this invention has been particularly shown and described with references to preferred embodiments thereof, it will be understood by those skilled in the art that various changes in form and details may be made therein without departing from the scope of the invention encompassed by the appended claims.

What is claimed is:

1. A method for recognizing malicious traffic in a mobile network comprising:
    identifying a mobile subscriber by a permanent mobile subscriber identity;
    detecting the malicious traffic to identify an IP address temporarily associated with the mobile subscriber;
    matching the identity of the mobile subscriber to the malicious traffic by matching the permanent mobile subscriber identity identified to the IP address temporarily associated with the mobile subscriber as identified from the malicious traffic detected; and
    based on the result of matching the identity of the mobile subscriber to the malicious traffic, notifying the mobile subscriber with the identity of the mobile subscriber of the malicious traffic associated with the mobile subscriber by using the permanent mobile subscriber identity and not the IP address temporarily associated with the mobile subscriber.

2. The method of claim 1 wherein the mobile subscriber identity is selected from a group consisting of an IMSI, a MSIDN, a phone number and a login name.

3. The method of claim 2 wherein matching includes capturing the permanent mobile subscriber identity from a message selected from a group consisting of a PDP context request message and a RADIUS accounting packet.

4. The method of claim 2 wherein matching includes querying the permanent mobile subscriber identity from a network element selected from a group consisting of a Charging Gateway, a Gateway GRRS Support Node, a Serving GPRS Support Node, a RADIUS server, and a Home Location Registry.

5. The method of claim 1 wherein the mobile subscriber is notified by a notification.

6. The method of claim 5 wherein the notification is selected from a group consisting of a SMS message, a MMS message, a IM message, a phone call, a Push-to-Talk message, and e-mail message, a voice mail message, a WAP redirection and a HTTP redirection.

7. The method of claim 1 wherein the malicious traffic associated with the mobile subscriber is selected from at least one of a group consisting of a malicious traffic sent by the mobile subscriber and a malicious traffic received by the mobile subscriber.

8. The method of claim 1 further comprising:
    notifying a content server to create a web page displaying a message based on the malicious traffic associated with the mobile subscriber; and
    notifying a redirecting network element to redirect the mobile subscriber to the web server.

9. The method of claim 8 wherein the message displayed is selected from a group consisting of a warning to desist and an instruction to disinfect.

10. The method of claim 8 wherein the redirecting network element is selected from a group consisting of a Domain Name Server and an Internet Protocol router.

11. The method of claim 1, further comprising notifying an administrative system of the malicious traffic associated with the mobile subscriber.

12. The method of claim 1, further comprising notifying a network element which disables a mobile data account of the mobile subscriber temporarily or permanently.

13. The method of claim 1, further comprising sending at least one session detail to a database system when the malicious traffic associated with the mobile subscriber is detected.

14. The method of claim 13 wherein the session details is selected for at least one of a group consisting of a phone number, an IP address, a session timestamp, a number of packets sent, a number of bytes sent, and an identification of malicious activity.

15. The method of claim 1 wherein the notifying step the mobile subscriber uses using a first method different from a second method used for communicating malicious traffic.

16. The method of claim 1 wherein the notifying step is carried out by using a method native to an air interface used for sending messages to the mobile subscriber.

17. The method of claim 16 wherein the detecting step is carried outside a radio area network.

18. The method of claim 1 wherein matching includes matching the permanent mobile subscriber identity identified to the IP address temporarily associated with the mobile subscriber as identified from the malicious traffic detected and a time the malicious traffic was detected to form the match; and
    wherein notifying includes based on the match formed, notifying the mobile subscriber using the permanent mobile subscriber identity of the match even if the IP address identified, once associated with the mobile subscriber at the time the malicious traffic was detected, is no longer valid.

19. The method of claim 1 wherein notifying includes notifying the mobile subscriber of the malicious traffic using any one of SMS, MMS, IM, voice, email, and Push to Talk.

20. The method of claim 1 wherein notifying includes in response to any one of HTTP GET and WAP GET, redirecting the mobile subscriber to a webpage notification of the malicious traffic.

21. A method for recognizing malicious traffic in an IP network comprising:
    given an IP packet used to identify a mobile subscriber and other IP packets, analyzing each IP packet having a first portion and a second portion, the first portion having a source IP address and a destination IP address;

identifying a mobile subscriber by a permanent mobile subscriber identity from the second portion of the IP packet used to identify the mobile subscriber;

detecting the malicious traffic to identify an IP address temporarily associated with the mobile subscriber from the second portion of the other IP packets;

matching the identity of the mobile subscriber to the malicious traffic by matching the permanent mobile subscriber identity to the IP address temporarily associated with the mobile subscriber as identified from the malicious traffic detected to form a match; and based on the result of matching the identity of the mobile subscriber to the malicious traffic, notifying the mobile subscriber with the identity of the mobile subscriber of the malicious traffic associated with the mobile subscriber using the permanent mobile subscriber identity and not the IP address temporarily associated with the mobile subscriber from the second portion of the IP packet.

22. The method of claim 21 wherein the second portion of the IP packet used to identify the mobile subscriber is selected from a group consisting of a PDP context activation message and a RADIUS accounting packet.

23. The method of claim 21 wherein the mobile subscriber is notified by a notification.

24. The method of claim 23 wherein the notification is selected from a group consisting of a SMS message, a MMS message, a IM message, a phone call, a Push-to-Talk message, an email message, a voice mail message, a WAP redirection and a HTTP redirection.

25. The method of claim 21 wherein the IP packet used to identify the mobile subscriber is sent over an interface selected from a group consisting of a Gn interface, and a Pi interface.

26. The method of claim 21 wherein the malicious traffic associated with the mobile subscriber is selected from at least one of a group consisting of a malicious traffic sent by the mobile subscriber and a malicious traffic received by the mobile subscriber.

27. The method of claim 21 further comprising:

notifying a web server to create a web page displaying a message based on the malicious traffic associated with the mobile subscriber; and notifying a redirecting network element to redirect the mobile subscriber to the web server.

28. The method of claim 27 wherein the message displayed is selected from a group consisting of a warning to desist and an instruction to disinfect.

29. The method of claim 27 wherein the redirecting network element is selected from a group consisting of a Domain Name Server and an Internet Protocol router.

30. The method of claim 21 further comprising notifying an administrative system of the malicious traffic associated with the mobile subscriber.

31. The method of claim 21 further comprising notifying a network element which disables a mobile data account of the mobile subscriber temporarily or permanently.

32. The method of claim 21 further comprising sending at least one session detail to a database system when the malicious traffic associated with the mobile subscriber is detected.

33. The method of claim 32 wherein the session details is selected for at least one of a group consisting of a phone number, an IP address, a session timestamp, a number of packets sent, and a number of bytes sent, and an identification of malicious activity.

* * * * *